United States Patent
Roos et al.

(10) Patent No.: US 8,025,756 B2
(45) Date of Patent: Sep. 27, 2011

(54) METHOD OF BONDING MATERIALS OF CONSTRUCTION USING NANOSCALE, SUPERPARAMAGNETIC POLY(METH)ACRYLATE POLYMERS

(75) Inventors: Sebastian Roos, Kelkheim (DE); Gerd Loehden, Essen (DE); Jan Hendrik Schattka, Hanau (DE); Manfred Braum, Mainz (DE); Markus Pridoehl, Grosskrotzenburg (DE); Guido Zimmermann, Bruehl (DE); Andreas Huether, Alzenau (DE)

(73) Assignee: Evonik Degussa GmbH, Essen (DE)

( * ) Notice: Subject to any disclaimer, the term of this patent is extended or adjusted under 35 U.S.C. 154(b) by 167 days.

(21) Appl. No.: 12/279,197

(22) PCT Filed: Nov. 21, 2006

(86) PCT No.: PCT/EP2006/068707
§ 371 (c)(1), (2), (4) Date: Oct. 21, 2008

(87) PCT Pub. No.: WO2007/093237
PCT Pub. Date: Aug. 23, 2007

(65) Prior Publication Data
US 2009/0165949 A1 Jul. 2, 2009

(30) Foreign Application Priority Data

Feb. 16, 2006 (DE) .......................... 10 2006 007 563

(51) Int. Cl.
*B32B 37/00* (2006.01)
(52) U.S. Cl. ............... 156/272.4; 156/272.2; 156/275.7; 156/332; 252/62.54; 252/65.56
(58) Field of Classification Search ............... 252/62.54; 156/332; 524/431
See application file for complete search history.

(56) References Cited

U.S. PATENT DOCUMENTS

| | | | |
|---|---|---|---|
| 4,421,660 A * | 12/1983 | Solc nee Hajna | 252/62.54 |
| 4,740,443 A * | 4/1988 | Nakahara et al. | 430/108.24 |
| 5,794,403 A | 8/1998 | Oberlander et al. | |
| 6,498,209 B1 | 12/2002 | Loehden et al. | |
| 6,566,441 B1 | 5/2003 | Lohden et al. | |
| 6,809,163 B2 | 10/2004 | Schultes et al. | |
| 6,989,409 B2 | 1/2006 | Loehden et al. | |
| 7,147,742 B2 * | 12/2006 | Kirsten | 156/272.2 |
| 2004/0249037 A1 * | 12/2004 | Kolbe et al. | 524/401 |
| 2007/0068088 A1 | 3/2007 | Einfeldt et al. | |
| 2007/0117948 A1 | 5/2007 | Loehden et al. | |
| 2007/0193156 A1 | 8/2007 | Kautz et al. | |
| 2007/0193159 A1 | 8/2007 | Schattka et al. | |
| 2007/0196655 A1 | 8/2007 | Schattka et al. | |
| 2007/0208107 A1 | 9/2007 | Schattka et al. | |
| 2007/0208109 A1 | 9/2007 | Kautz et al. | |
| 2007/0259987 A1 | 11/2007 | Schattka et al. | |
| 2008/0057205 A1 | 3/2008 | Lohden et al. | |
| 2008/0237529 A1 | 10/2008 | Schattka et al. | |
| 2008/0262176 A1 | 10/2008 | Loehden et al. | |
| 2008/0292893 A1 | 11/2008 | Loehden et al. | |
| 2008/0293854 A1 | 11/2008 | Schattka et al. | |
| 2009/0048401 A1 | 2/2009 | Loehden et al. | |
| 2009/0062508 A1 | 3/2009 | Balk et al. | |
| 2009/0159834 A1 | 6/2009 | Roos et al. | |

FOREIGN PATENT DOCUMENTS

| | | |
|---|---|---|
| DE | 199 54 960 | 6/2000 |
| DE | 19954960 A1 * | 6/2000 |
| DE | 199 24 138 | 11/2000 |
| WO | WO 2006058689 A1 * | 6/2006 |

OTHER PUBLICATIONS

English Machine Translation of DE19954960A1 obtained May 28, 2010.*
A. Ditsch, P.E. Laibinis, D.I.C. Wang, T.A. Hatton, "Controlled Clustering and Enhanced Stability of Polymer-coated Magnetic Nanoparticles", Langmuir 2005, 21, 6006-6018.*
U.S. Appl. No. 12/937,911, filed Oct. 14, 2010, Roos, et al.

* cited by examiner

*Primary Examiner* — Richard Crispino
*Assistant Examiner* — Elizabeth Royston
(74) *Attorney, Agent, or Firm* — Oblon, Spivak, McClelland, Maier & Neustadt, L.L.P.

(57) ABSTRACT

The invention relates to a method of bonding different materials of construction using hybrid materials comprising nanoscale, superparamagnetic, ferromagnetic, ferrimagnetic or paramagnetic powders enveloped or in part not enveloped by poly(meth)acrylates, and to their use.

17 Claims, No Drawings

METHOD OF BONDING MATERIALS OF CONSTRUCTION USING NANOSCALE, SUPERPARAMAGNETIC POLY(METH)ACRYLATE POLYMERS

The invention relates to a method of adhesively bonding a variety of materials with hybrid materials comprising nanoscale, superparamagnetic, ferromagnetic, ferrimagnetic or paramagnetic powders enveloped or in part not enveloped by poly(meth)acrylates, and to their use.

PRIOR ART

In DE 100 37 883 (Henkel) 0.1% by weight-70% by weight of magnetic particles are used in order to heat a substrate by means of microwave radiation. The substrate used is an adhesive, which sets as a result of the heating. The heating of the adhesive can also be utilized to soften the adhesive. Interaction between particles and polymer is not described.

DE 100 40 325 (Henkel) describes a method involving applying a microwave-activable primer and a hot-melt adhesive to substrates and using microwaves to carry out heating and bonding.

DE 102 58 951 (Sus Tech GmbH) describes an adhesive sheet comprising a compound of ferrite particles (surface-modified with oleic acid) and PE, PP, EVA and copolymers. The ferrite particles may also have been modified with silanes, quaternary ammonium compounds and saturated/unsaturated fatty acids and salts of strong inorganic acids.

DE 199 24 138 (Henkel) describes an adhesive composition with nanoscale particles.

EP 498 998 describes a method of heating a polymer by microwaves, where ferromagnetic particles are dispersed in the polymer matrix and microwaves are irradiated. The ferromagnetic particles are merely dispersed in the polymer matrix.

WO 01/28 771 (Loctite) describes a curable composition comprising 10% by weight-40% by weight of particles which can absorb microwaves, a curable component, and a curing agent. The components are merely mixed.

WO 03/04 2315 (Degussa) discloses an adhesive composition for producing thermosets, comprising a polymer blend and crosslinker particles, the crosslinker particles being composed of fillers, which are ferromagnetic, ferrimagnetic, superparamagnetic or paramagnetic, and crosslinker units bonded chemically to the filler particles. The filler particles may also have been surface-modified. The filler particles may have a core/shell structure. The adhesive association obtained can be parted again by heating it to a temperature higher than the ceiling temperature or to a temperature sufficient to break the chemical bonds of the thermally labile groups of the surface-modified filler particles.

DE-A-101 63 399 describes a nanoparticulate preparation which has a coherent phase and, dispersed therein, at least one particulate phase of superparamagnetic, nanoscale particles. The particles have a volume-averaged particle diameter in the range from 2 to 100 nm and contain at least one mixed metal oxide of the general formula $MIIMIIIO_4$, in which MII stands for a first metal component which comprises at least two different, divalent metals, and MIII stands for a further metal component which comprises at least one trivalent metal. The coherent phase may be composed of water, an organic solvent, a polymerizable monomer, a polymerizable monomer mixture, a polymer and mixtures. Preparations in the form of an adhesive composition are preferred.

DE10116721 (BMW) describes two-component adhesives for use in bodywork construction, in particular for sealing a flange seam. This adhesive reacts in two stages, the first reaction taking place in a chemical two-component reaction leading to a product which is firm to the touch and resists being washed off. The reaction proceeds at room temperature or with gentle heating. Heating takes place inductively or through IR radiation. The second—likewise chemical—reaction takes place in the priming oven.

EP 1186642 (Sika) describes two-component systems featuring a resin component and a curing component, whose partial curing takes place for example through UV radiation in order to provide the desired early strength and handleability. The system passes through two unalike curing operations, one curing operation being a reaction which proceeds at room temperature between at least one resin and at least one curing agent, and there being present at least one further crosslinking system that crosslinks by means of a curing operation.

It is an object of the invention to provide a method of adhesively bonding different materials, preferably a two-stage method.

This object is achieved through a method of adhesively bonding with hybrid material comprising nanoscale superparamagnetic, ferromagnetic, ferrimagnetic or paramagnetic particles enveloped by polymers, or by means of hybrid materials comprising mixtures of enveloped and unenveloped nanoscale superparamagnetic, ferromagnetic, ferrimagnetic or paramagnetic particles, the hybrid material being present in an adhesive matrix. The particles are enveloped preferably using poly(meth)acrylates.

Through the use of encased nanoscale, superparamagnetic, ferromagnetic, ferrimagnetic or paramagnetic particles with the polymer, improved interaction of the particle with the polymer envelope is achieved, and it is therefore possible to achieve the heating of the adhesive with fewer nanoscale, superparamagnetic, ferromagnetic, ferrimagnetic or paramagnetic particles than are needed in the prior art.

With the adhesives of the invention comprising hybrid materials it is possible to prepare 2-stage adhesives which in one material realize a simple adhesive-bonding effect (preliminary adhesive bonding, fixing) and ultimate adhesive bonding through introduction of high energy. The first stage is a physical, the second stage a chemical conversion. The hybrid materials of the invention are preferably embedded into the epoxy matrix of an epoxy adhesive. In epoxy adhesives the introduction of the energy, preferably inductive energy, produces the two adhesive stages, by virtue of the fact that in a first stage the nanoscale, superparamagnetic, ferromagnetic, ferrimagnetic or paramagnetic particles, encased inventively by polymers, undergo gelling, and hence allow preliminary adhesive bonding, and in a 2nd step, as a result of introduction of further energy, the crosslinking of the epoxy matrix, the ultimate adhesive bonding, takes place.

It has been found that it is possible to carry out outstanding adhesive bonding of materials which are not inductively heatable. Inductive energy is used specifically to heat the adhesive and hence to cause its pregelling and/or curing. In the first step (pregelling) the introduction of energy, preferably inductive energy, is used to bring about incipient swelling or dissolution of the polymers which encase the nanoscale, superparamagnetic, ferromagnetic, ferrimagnetic or paramagnetic particles. In conjunction with plasticizers present in the surrounding matrix, a paste is formed which has a rubber-elastic behaviour like that of a gel. Pregelling takes place at temperatures between 50° C. and 100° C. The pregelled adhesive produces a bond of sufficient quality between the materials to be bonded adhesively. Even at this stage, therefore, a product which is firm to the touch and resists being washed out is produced, as is required, for example, in the automotive industry. In the subsequent curing step, renewed supply of energy initiates crosslinking reactions which produce the ultimate integrated material system. The curing step takes place at temperatures of 140° C.-200° C.

The heating of the material to be adhesively bonded is unnecessary. Unwanted phenomena, such as the distortion of the material (bodywork components) as a result of the heating, for example, can therefore be avoided. Moreover, it is of course also possible to carry out adhesive bonding of inductively heatable materials. An advantage here in turn is that even thick adhesive layers can be activated without having to carry out unnecessary severe heating of the material to be bonded, which would lead likewise to instances of distortion. The use of relatively thick adhesive layers is desirable in particular when there are varying dimensional tolerances. Insufficient gelling or instances of overheating with resinified oils, difficult to remove, have been the consequence in the case of the conventional adhesive-bonding techniques.

The adhesives of the invention can be activated directly by means of inductive energy. As a consequence it is possible to bond all conceivable combinations of materials, since the heatability of the material to be bonded has no effect. It is possible to bond inductively heatable materials to one another or to materials which are not inductively heatable, or else to bond materials which are not inductively heatable to one another.

The nanoscale, superparamagnetic, ferromagnetic, ferrimagnetic or paramagnetic particles are emulsified without prior activation or precoating in a system comprising one or more monomers, water and an inert solvent, with the assistance where appropriate of an emulsifier and/or of a hydrophobic agent, and the polymerization is subsequently initiated using the typical methods. The nanoscale, superparamagnetic, ferromagnetic, ferrimagnetic or paramagnetic particles can be surrounded in a core/shell construction with one or more shells of polymers or polymer blends. The cores may be enveloped with one shell, or else with two or more shells, or with a shell with gradients. The shells may have like or different polymer compositions, or the polymer composition may change within a shell (gradients).

In a first step, by means of miniemulsion polymerization, a first shell of the core/shell system is applied to the core. The further shells, where appropriate, are formed in situ by metered addition of the monomer stream.

Monomers used are mixtures of (meth)acrylates.

Polymethyl methacrylates are generally obtained by free-radical polymerization of mixtures comprising methyl methacrylate. In general these mixtures contain at least 40% by weight, preferably at least 60% by weight and with particular preference at least 80% by weight, based on the weight of the monomers, of methyl methacrylate. In addition these mixtures for the preparation of polymethyl methacrylates may comprise further (meth)acrylates which are copolymerizable with methyl methacrylate. The expression (meth)acrylates here denotes not only methacrylate, such as methyl methacrylate, ethyl methacrylate, etc., for example, but also acrylate, such as methyl acrylate, ethyl acrylate, etc., for example, and additionally mixtures of both.

These monomers are widely known. They include, among others, (meth)acrylates which derive from saturated alcohols, such as methyl acrylate, ethyl (meth)acrylate, propyl(meth)acrylate, n-butyl(meth)acrylate, tert-butyl(meth)acrylate, pentyl (meth)acrylate and 2-ethylhexyl(meth)acrylate, for example; (meth)acrylates which derive from unsaturated alcohols, such as oleyl(meth)acrylate, 2-propynyl (meth)acrylate, allyl(meth)acrylate, vinyl (meth)acrylate, for example; aryl(meth)acrylates, such as benzyl(meth)acrylate or phenyl(meth)acrylate, it being possible for the aryl radicals in each case to be unsubstituted or to be substituted up to four times; cycloalkyl(meth)acrylates, such as 3-vinylcyclohexyl (meth)acrylate, bornyl(meth)acrylate; hydroxylalkyl (meth) acrylates, such as 3-hydroxypropyl(meth)acrylate, 3,4-dihydroxybutyl(meth)acrylate, 2-hydroxyethyl (meth)acrylate, 2-hydroxypropyl(meth)acrylate; glycol di(meth)acrylates, such as 1,4-butanediol (meth)acrylate, (meth)acrylates of ether alcohols, such as tetrahydrofurfuryl(meth)acrylate, vinyloxyethoxy-ethyl (meth)acrylate; amides and nitriles of (meth)acrylic acid, such as N-(3-dimethylaminopropyl) (meth)acrylamide, N-(diethylphosphono)(meth)acrylamide, 1-methacryloylamido-2-methyl-2-propanol; sulphur-containing methacrylates, such as ethyl-sulphinylethyl (meth) acrylate, 4-thiocyanatobutyl (meth)acrylate, ethylsulphonylethyl(meth)acrylate, thiocyanatomethyl(meth)acrylate, methylsulphinylmethyl (meth)acrylate, bis((meth)acryloyloxyethyl) sulphide; polyfunctional (meth)acrylates, such as trimethyloyl-propane tri(meth)acrylate.

Besides the (meth)acrylates set out above, the compositions for polymerization may also contain further unsaturated monomers which are copolymerizable with methyl methacrylate and with the aforementioned (meth)acrylates. Such monomers include, among others, 1-alkenes, such as hex-1-ene, hept-1-ene; branched alkenes, such as vinylcyclohexane, 3,3-dimethyl-1-propene, 3-methyl-1-diisobutylene, 4-methylpent-1-ene, for example; acrylonitrile; vinyl esters, such as vinyl acetate; styrene, substituted styrenes having an alkyl substituent in the side chain, such as [alpha]-methylstyrene and [alpha]-ethylstyrene, for example, substituted styrenes with an alkyl substituent on the ring, such as vinyltoluene and p-methylstyrene, halogenated styrenes, such as monochlorostyrenes, dichlorostyrenes, tribromostyrenes and tetrabromo-styrenes, for example; heterocyclic vinyl compounds, such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, vinylpiperidine, 9-vinylcarbazole, 3-vinylcarbazole, 4-vinylcarbazole, 1-vinylimidazole, 2-methyl-1-vinylimidazole, N-vinylpyrrolidone, 2-vinylpyrrolidone, N-vinylpyrrolidine, 3-vinylpyrrolidine, N-vinylcaprolactam, N-vinylbutyro-lactam, vinyloxolane, vinylfuran, vinylthiophene, vinylthiolane, vinylthiazoles and hydrogenated vinylthiazoles, vinyloxazoles and hydrogenated vinyloxazoles; vinyl and isoprenyl ethers; maleic acid derivatives, such as maleic anhydride, methylmaleic anhydride, maleimide, methylmaleimide, for example; and dienes, such as divinylbenzene, for example.

In general these comonomers are used in an amount of 0% to 60% by weight, preferably 0% to 40% by weight and with particular preference 0% to 20% by weight, based on the weight of the monomers, it being possible for the compounds to be used individually or as a mixture.

The polymerization is generally initiated using known free-radical initiators. The preferred initiators include, among others, the azo initiators widely known in the art, such as AIBN and 1,1-azobiscyclohexane-carbonitrile, water-soluble free-radical initiators, such as peroxosulphates or hydrogen peroxide, for example, and also peroxy compounds, such as methyl ethyl ketone peroxide, acetylacetone peroxide, dilauryl peroxide, tert-butyl per-2-ethylhexanoate, ketone peroxide, methyl isobutyl ketone peroxide, cyclohexanone peroxide, dibenzoyl peroxide, tert-butyl peroxybenzoate, tert-butyl peroxyisopropyl carbonate, 2,5-bis(2-ethylhexanoylperoxy)-2,5-dimethylhexane, tert-butyl peroxy-2-ethylhexanoate, tert-butyl peroxy-3,5,5-trimethylhexanoate, dicumyl peroxide, 1,1-bis(tert-butylperoxy)cyclohexane, 1,1-bis(tert-butylperoxy)-3,3,5-trimethylcyclohexane, cumyl hydroperoxide, tert-butyl hydroperoxide, bis(4-tert-butylcyclohexyl) peroxydicarbonate, mixtures of two or more of the aforementioned compounds with one another, and also mixtures of the aforementioned compounds with unstated compounds which can likewise form free radicals.

These compounds are used frequently in an amount of 0.01% to 10% by weight, preferably of 0.1% to 3% by weight, based on the weight of the monomers. In this context it is possible to use different poly(meth)acrylates which differ for example in molecular weight or in the monomer composition.

Hydrophobic agents as well can be added to the hybrid material. Suitable examples include hydrophobes from the group of the hexadecanes, tetraethylsilanes, oligostyrenes, polyesters or hexafluorobenzenes. Particular preference is given to copolymerizable hydrophobes, since they do not exude in the course of subsequent use.

Particular preference is given to (meth)acrylates which derive from saturated alcohols having 6-24 C atoms, it being possible for the alcohol residue to be linear or branched.

Thus, for example, one monomer composition comprises ethylenically unsaturated monomers of formula (I)

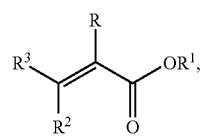

(I)

in which R is hydrogen or methyl, $R^1$ is a linear or branched alkyl radical having 6 to 40 carbon atoms, preferably 6 to 24 carbon atoms, $R^2$ and $R^3$ independently are hydrogen or a group of the formula —COOR', where R' represents hydrogen or a linear or branched alkyl radical having 6 to 40 carbon atoms.

The ester compounds with long-chain alcohol residue can be obtained for example by reacting (meth)acrylates, fumarates, maleates and/or the corresponding acids with long-chain fatty alcohols, the product generally comprising a mixture of esters, such as, for example, (meth)acrylates with alcohol residues whose chains differ in length. These fatty alcohols include, among others, Oxo Alcohol® 7911 and Oxo Alcohol® 7900, Oxo Alcohol® 1100 from Monsanto; Alphanol® 79 from ICI; Nafol® 1620, Alfol® 610 and Alfol® 810 from Condea; Epal® 610 and Epal® 810 from Ethyl Corporation; Linevol® 79, Linevol® 911 and Dobanol® 25L from Shell AG; Lial 125 from Augusta® Milan; Dehydad® and Lorol® from Henkel KGaA, and Linopol® 7-11 and Acropol® 91 Ugine Kuhlmann.

The abovementioned ethylenically unsaturated monomers can be used individually or as mixtures. In preferred embodiments of the method of the invention at least 50 percent by weight of the monomers, preferably at least 60 percent by weight of the monomers, with particular preference more than 80% by weight of the monomers, based on the total weight of the ethylenically unsaturated monomers, are (meth)acrylates.

Preference is given, moreover, to monomer compositions which contain at least 60 percent by weight, with particular preference more than 80% by weight, of (meth)acrylates having alkyl or heteroalkyl chains that contain at least 6 carbon atoms, based on the total weight of the ethylenically unsaturated monomers.

Besides the (meth)acrylates preference is also given to maleates and fumarates which additionally have long-chain alcohol residues.

By way of example it is possible to use hydrophobes which are derived from the group of the alkyl (meth)acrylates having 10 to 30 carbon atoms in the alcohol group, especially undecyl(meth)acrylate, 5-methylundecyl(meth)acrylate, dodecyl (meth)acrylate, 2-methyldodecyl(meth)acrylate, tridecyl (meth)acrylate, 5-methyltridecyl(meth)acrylate, tetradecyl (meth)acrylate, pentadecyl(meth)acrylate, hexadecyl (meth) acrylate, 2-methylhexadecyl(meth)acrylate, heptadecyl (meth)acrylate, 5-isopropylheptadecyl (meth)acrylate, 4-tert-butyloctadecyl(meth)acrylate, 5-ethyloctadecyl(meth) acrylate, 3-isopropyloctadecyl (meth)acrylate, octadecyl (meth)acrylate, nonadecyl (meth)acrylate, eicosyl(meth) acrylate, cetyleicosyl (meth)acrylate, stearyleicosyl(meth) acrylate, docosyl (meth)acrylate, eicosyltetratriacontyl (meth)acrylate, lauryl(meth)acrylates, stearyl(meth) acrylates, behenyl(meth)acrylates and/or methacrylic esters and mixtures thereof.

In order to control the molecular weight of the polymers it is possible to carry out the polymerization in the presence if desired of regulators. Examples of suitable regulators include aldehydes such as formaldehyde, acetaldehyde, propionaldehyde, n-butyraldehyde and isobutyraldehyde, formic acid, ammonium formate, hydroxylammonium sulphate and hydroxylammonium phosphate. Additionally it is possible to use regulators which contain sulphur in organically bonded form, such as organic compounds containing SH groups, such as thioglycolacetic acid, mercaptopropionic acid, mercaptoethanol, mercaptopropanol, mercaptobutanol, mercaptohexanol, dodecyl mercaptan and tert-dodecyl mercaptan. As regulators it is possible in addition to use salts of hydrazine such as hydrazinium sulphate. The amounts of regulator, based on the monomers to be polymerized, are 0% to 5%, preferably 0.05% to 0.3% by weight.

The cores of the invention, the nanoscale, superparamagnetic, ferromagnetic, ferrimagnetic or paramagnetic particles, are composed of a matrix and a domain. The particles are composed of magnetic metal oxide domains having a diameter of 2 to 100 nm in a non-magnetic metal oxide matrix or metal dioxide matrix. The magnetic metal oxide domains may be selected from the group of the ferrites, with particular preference from the group of the iron oxides. They may be surrounded in turn, completely or partially, by a non-magnetic matrix, from the group for example of the silicon oxides. The nanoscale, superparamagnetic, ferromagnetic, ferrimagnetic or paramagnetic particles are in the form of powder. The powder may be composed of aggregated primary particles. By aggregated in the sense of the invention are meant three-dimensional structures of commerged primary particles. Two or more aggregates may join to form agglomerates. These agglomerates can easily be separated again. In contrast, breaking down the aggregates into the primary particles is generally not possible.

The aggregate diameter of the superparamagnetic powder may preferably be greater than 100 nm and less than 1 µm. With preference the aggregates of the superparamagnetic, ferromagnetic, ferrimagnetic or paramagnetic powder may have a diameter at least in one spatial direction of not more than 250 nm.

By domains are meant regions within a matrix that are spatially separate from one another. The domains of the superparamagnetic, ferromagnetic, ferrimagnetic or paramagnetic powder have a diameter of between 2 and 100 nm.

The domains may also contain non-magnetic regions which make no contribution to the magnetic properties of the powder.

In addition it is also possible for there to be magnetic domains which by virtue of their size do not exhibit superparamagnetism, and which induce remanence. This leads to an increase in the volume-specific saturation magnetization. The proportion of these domains in comparison to the number of superparamagnetic, ferromagnetic, ferrimagnetic or paramagnetic domains, however, is low. In accordance with the present invention the number of superparamagnetic, ferromagnetic, ferrimagnetic or paramagnetic domains present in the superparamagnetic, ferromagnetic, ferrimagnetic or paramagnetic powder is such as to allow the preparation of the invention to be heated by means of a magnetic or electromagnetic alternating field. The domains of the superparamagnetic, ferromagnetic, ferrimagnetic or paramagnetic powder may be surrounded completely or only partially by the encompassing matrix. Partially surrounded means that individual domains may protrude from the surface of an aggregate.

The domains may contain one or more metal oxides.

The magnetic domains may contain preferably the oxides of iron, cobalt, nickel, chromium, europium, yttrium, samarium or gadolinium. In these domains the metal oxides may be present in a uniform modification or in different modifications.

One particularly preferred magnetic domain is iron oxide in the form of gamma-$Fe_2O_3$ ($\gamma$-$Fe_2O_3$), $Fe_3O_4$, mixtures of gamma-$Fe_2O_3$ ($\gamma$-$Fe_2O_3$) and/or $Fe_3O_4$.

The magnetic domains may further be present in the form of a mixed oxide of at least two metals, with the metal components iron, cobalt, nickel, tin, zinc, cadmium, magnesium, manganese, copper, barium, magnesium, lithium or yttrium.

The magnetic domains may additionally be substances with the general formula $MIIFe_2O_4$, in which MII stands for a metal component which comprises at least two different, divalent metals. With preference one of the divalent metals may be manganese, zinc, magnesium, cobalt, copper, cadmium or nickel.

Additionally it is possible for the magnetic domains to be composed of ternary systems of the general formula $(Ma_{1-x-y} Mb_xFe_y)IIFe_2IIIO_4$, where Ma and Mb, respectively, are the metals manganese, cobalt, nickel, zinc, copper, magnesium, barium, yttrium, tin, lithium, cadmium, magnesium, calcium, strontium, titanium, chromium, vanadium, niobium, molybdenum, with x=0.05 to 0.95, y=0 to 0.95 and x+y$\leq$1.

Particular preference may be given to $ZnFe_2O_4$, $MnFe_2O_4$, $Mn_{0.6}Fe_{0.4}Fe_2O_4$, $Mn_{0.5}Zn_{0.5}Fe_2O_4$, $Zn_{0.1}Fe_{1.9}O_4$, $Zn_{0.2}Fe_{1.8}O_4$, $Zn_{0.3}Fe_{1.7}O_4$, $Zn_{0.4}Fe_{1.6}O_4$ or $Mn_{0.39}Zn_{0.27}Fe_{2.34}O_4$, $MgFe_2O_3$, $Mg_{1.2}Mn_{0.2}Fe_{1.6}O_4$, $Mg_{1.4}Mn_{0.4}Fe_{1.2}O_4$, $Mg_{1.6}Mn_{0.6}Fe_{0.8}O_4$, $Mg_{1.8}Mn_{0.8}Fe_{0.4}O_4$.

The choice of the metal oxide of the non-magnetic matrix is not further restricted. Preference may be given to the oxides of titanium, zirconium, zinc, aluminium, silicon, cerium or tin.

For the purposes of the invention the metal oxides also include metal dioxides, such as silicon dioxide, for example.

In addition it is possible for the matrix and/or the domains to be in amorphous and/or crystalline form.

The proportion of the magnetic domains in the powder is not restricted provided that there is spatial separation of matrix and domains. The fraction of the magnetic domains in the superparamagnetic, ferromagnetic, ferrimagnetic or paramagnetic powder can be preferably 10% to 100% by weight.

Suitable superparamagnetic powders are described for example in EP-A-1284485 and also in DE 10317067, hereby incorporated in their entirety by reference.

The preparation of the invention may preferably have a fraction of superparamagnetic powder in a range from 0.01% to 60% by weight, preferably a range from 0.05% to 50% by weight and with very particular preference in a range from 0.1% to 10% by weight.

The superparamagnetic, ferromagnetic, ferrimagnetic or paramagnetic powders are processed further with a miniemulsion polymerization process to give the hybrid materials of the invention.

The miniemulsion polymerization can be carried out as follows:

a)
In a first step the nanoscale powder is dispersed in the monomers or the monomer mixture or in water.

b)
In the second step a monomer or a monomer mixture is dispersed with hydrophobic agents and emulsifier in water.

c)
In the third step the dispersions from a) and b) are dispersed with the aid of an emulsifier by means of ultrasound, membrane, rotor/stator system, stirrer or high pressure.

d)
The polymerization of the dispersion from c) is initiated thermally.

The fraction of the superparamagnetic, ferromagnetic, ferrimagnetic or paramagnetic powders in polymers can be between 1-99% by weight.

The examples given below are given for better illustration of the present invention, but are not such as to restrict the invention to the features disclosed herein.

EXAMPLE

The change in viscosity was investigated, as an important parameter for the properties of adhesives.

A conventional adhesive (Betamate 1020, Dow, Switzerland) was slowly heated from room temperature to 93° C. and cooled back down to room temperature. This corresponds to the temperature profile for pregelling in the case of 2-stage adhesives. The energy was introduced by conventional electrical heating power, as a result of the specific apparatus. The viscosity at 35° C. and 65° C. are investigated (Example C).

For an identical investigative series, this adhesive material is admixed with the nanoscale superparamagnetic, ferromagnetic, ferrimagnetic or paramagnetic particles of the invention, enveloped by poly(meth)acrylates, in an amount of 12% by weight. Here again the viscosity is investigated at 35° C. and 65° C. (Example I1).

In a further experimental series less thixotropic agent and again 12% by weight of the nanoscale superparamagnetic, ferromagnetic, ferrimagnetic or paramagnetic particles of the invention, enveloped by poly(meth)acrylates, were added to the conventional adhesive (Betamate 1020, Dow, Switzerland) (Example I2).

|  | Viscosity at 35° C. [Pa s] | | Viscosity at 65° C. [Pa s] | |
| --- | --- | --- | --- | --- |
|  | Before heating | After heating | Before heating | After heating |
| Example C | 300 | 400 | 45 | 45 |
| Example I1 | 750 | 1100 | 100 | 400 |
| Example I2 | 350 | 1050 | 50 | 380 |

In the case of the conventional adhesives (C) the viscosities before heating and after heating are very close to one another. With the addition of nanoscale superparamagnetic, ferromagnetic, ferrimagnetic or paramagnetic particles of the invention enveloped by poly(meth)acrylates there is a significant increase in the viscosities. If thixotropic agents are omitted (I2) the initial viscosity is still relatively low, but remains at a far higher level after heating. In the case of the use of thixotropic agent and nanoscale superparamagnetic, ferromagnetic, ferrimagnetic or paramagnetic particles of the invention enveloped by poly(meth)acrylates (I1) the viscosities before heating and after heating are well above the viscosities of conventional adhesives.

Both at 35° C. and at 65° C. an improved preliminary adhesive bonding is achieved as a result of higher viscosities.

Bonding by Means of Supply of Inductive Energy

12% by weight of hybrid materials are incorporated into a conventional epoxy adhesive matrix. A bead of adhesive comprising this mixture, with a width of 1 cm and a height of 0.5 cm, was applied to an inductively non-heatable material. To introduce inductive energy a triple-wound cylinder coil (IFF, Ismaning) with a generator of type of STS M260S with 100% of the power is used. The coil is run once over the bead of adhesive, at a distance of 5 mm and a speed of 1.25 mm/s. The temperature profile was measured using a fibre-optic thermometer, which was arranged centrally in the bead of adhesive. It was possible to show that the adhesive could be heated from 25° C. to 90° C. within 20 s by means of inductive energy.

The invention claimed is:

1. An adhesive, comprising:
nanoscale superparamagnetic, ferromagnetic, ferrimagnetic, or paramagnetic particles not enveloped by poly(meth)acrylates; and
a core comprising nanoscale superparamagnetic, ferromagnetic, ferrimagnetic, or paramagnetic particles enveloped by at least one shell comprising at least one poly(meth)acrylate,
wherein the core comprises a matrix and domains,
each of the domains is a region within the matrix, spatially separate from other domains,
each of the domains comprises at least one magnetic metal oxide having a diameter of 2 to 100 nm, and
the matrix comprises a non-magnetic metal oxide or metal dioxide.

2. The adhesive according to claim 1, further comprising:
nanoscale superparamagnetic, ferromagnetic, ferrimagnetic, or paramagnetic particles not enveloped by poly(meth)acrylates in an epoxy resin matrix of an epoxy adhesive.

3. A method of adhesively bonding a first material to itself or to at least one second material, the method comprising:
applying the adhesive of claim 1, to the first material and, optionally, the at least one second material;
contacting the first material to itself or to the at least one second material; and
inductively heating the adhesive.

4. The method according to claim 3, wherein the applying comprises pregelling the adhesive inductive energy through a temperature increase, and the contacting comprises a subsequent curing through a further temperature increase.

5. The method according to claim 4, wherein the pregelling takes place at temperatures of 50-100° C.

6. The method according to claim 4, wherein the curing takes place at temperatures of 140-200° C.

7. A method for adhesively bonding a material to at least one further material which cannot be heated inductively, the method comprising applying the adhesive of claim 1 to the material, contacting it to the at least one further material, and inductively heatin the adhesive.

8. A method of building an automobile, aircraft, ship, rail vehicle, or space craft, the method comprising adhering parts or materials together with the adhesive according to claim 1.

9. The adhesive of claim 1, wherein each of the at least one shell may have a like or different polymer composition, or a polymer composition which changes within a shell by a gradient.

10. The adhesive of claim 1, wherein the at least one poly(meth)acrylate comprises at least 40% by weight methyl methacrylate.

11. The adhesive of claim 1, wherein the poly(meth)acrylate is a polymer or copolymer obtained by polymerizing at least one selected from the group consisting of a (meth)acrylate which derives from a saturated alcohol, a (meth)acrylate which derives from an unsaturated alcohol, an aryl (meth)acrylate, an aryl (meth)acrylate substitute substituted up to four times, a cycloalkyl (meth)acrylate, a hydroxylalkyl (meth)acrylate, a glycol di(meth)acrylate, a (meth)acrylate of an ether alcohol, an amide of (meth)acrylic acid, a nitrile of (meth)acrylic acid, and a polyfunctional (meth)acrylate.

12. The adhesive of claim 11, wherein the copolymer is present and further comprises at least one selected from the group consisting of a 1-alkene, a branched alkene, acrylonitrile, a vinyl ester, styrene, a substituted styrene having an alkyl substituent in the side chain, a substituted styrene with an alkyl substituent on the ring, a halogenated styrene, a heterocyclic vinyl compound, a vinyl ether, an isoprenyl ether, a maleic acid derivative, and a diene.

13. The adhesive of claim 1, wherein the poly(meth)acrylate comprises, in reacted form, at least one ethylenically unsaturated monomer of formula (I)

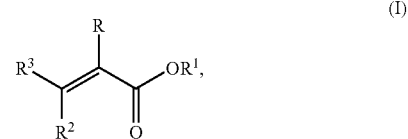

wherein R is hydrogen or methyl, $R^1$ is a linear or branched alkyl radical having 6 to 40 carbon atoms, $R^2$ and $R^3$ independently are hydrogen or a group of the formula —COOR', where R' represents hydrogen or a linear or branched alkyl radical having 6 to 40 carbon atoms.

14. The adhesive of claim 1, wherein the nanoscale particles are not precoated or preactivated.

15. The adhesive of claim 1, wherein the at least one magnetic metal oxide is:
a metal selected from the group consisting of iron, cobalt, nickel, chromium, europium, yttrium, samarium, and gadolinium;
a mixed oxide of at least two metals selected from the group consisting of iron, cobalt, nickel, tin, zinc, cadmium, magnesium, manganese, copper, barium, magnesium, lithium, and yttrium;
a substance of formula $MIIFe_2O_4$, wherein MII stands for a metal component comprising at least two different, divalent metals; or
a ternary system of formula $(Ma_{1-x-y}Mb_xFe_y)IIFe_2IIIO_4$, wherein Ma and Mb are the metals manganese, cobalt, nickel, zinc, copper, magnesium, barium, yttrium, tin, lithium, cadmium, calcium, strontium, titanium, chromium, vanadium, niobium, or molybdenum, with x=0.05 to 0.95, y=0 to 0.95, and x+y≦1.

16. The adhesive of claim 1, wherein the at least one magnetic metal oxide comprises at least one selected from the group consisting of gamma-$Fe_2O_3$ ($\gamma$-$Fe_2O_3$) and $Fe_3O_4$.

17. The adhesive of claim 1, wherein the at least one magnetic metal oxide is selected from the group consisting of $ZnFe_2O_4$, $MnFe_2O_4$, $Mn_{0.6}Fe_{0.4}Fe_2O_4$, $Mn_{0.5}Zn_{0.5}Fe_2O_4 Zn_{0.1}Fe_{1.9}O_4$, $Zn_{0.2}Fe_{1.8}O_4$, $Zn_{0.3}Fe_{1.7}O_4$, $Zn^{0.4}Fe_{1.6}O_4$ or $Mn_{0.39}Zn_{0.27}Fe_{2.34}O_4$, $MgFe_2O_3$, $Mg_{1.2}Mn_{0.2}Fe_{1.6}O_4$, $Mg_{1.4}Mn_{0.4}Fe_{1.2}O_4$, $Mg_{1.6}Mn_{0.6}Fe_{0.8}O_4$, and $Mg_{1.8}Mn_{0.8}Fe_{0.4}O_4$.

* * * * *